US007127941B2

(12) United States Patent
Shin

(10) Patent No.: US 7,127,941 B2
(45) Date of Patent: Oct. 31, 2006

(54) DIAGNOSIS SYSTEM FOR LIQUEFIED PETROLEUM INJECTION FUEL PUMP

(75) Inventor: Chang-Hyun Shin, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/118,836

(22) Filed: Apr. 29, 2005

(65) Prior Publication Data

US 2005/0241379 A1 Nov. 3, 2005

(30) Foreign Application Priority Data

Apr. 29, 2004 (KR) ..................... 10-2004-0029976

(51) Int. Cl.
*G01M 15/00* (2006.01)

(52) U.S. Cl. .................................................... 73/119 R

(58) Field of Classification Search .................. 73/116, 73/117.2, 117.3, 118.1, 119 A, 119 R
See application file for complete search history.

(56) References Cited

U.S. PATENT DOCUMENTS

2004/0033140 A1* 2/2004 Jensen et al. .................. 417/1
2004/0112126 A1* 6/2004 Hosoya ..................... 73/118.1
2005/0193991 A1* 9/2005 Shin ........................... 123/529
2005/0193992 A1* 9/2005 Shin ........................... 123/529
2005/0241378 A1* 11/2005 Shin et al. ................ 73/119 R

* cited by examiner

*Primary Examiner*—Eric S. McCall
(74) *Attorney, Agent, or Firm*—Morgan Lewis & Bockius LLP

(57) ABSTRACT

A Liquefied Petroleum Injection (LPI) fuel pump diagnosis system for determining the operation state of a fuel pump by analyzing a signal inputted from a fuel pump driver of an LPG tank into an interface box, including a fuel pump relay that provides power to the fuel pump and cut-off solenoid valves, an LPG switch that allows a user to isolate the fuel supply, a voltage detector disposed in the interface box that detects a voltage between the LPG switch and the fuel pump relay by being connected to a signal line that connects the LPG switch and fuel pump relay, and an ECU of the interface box that determines whether a signal line connecting the fuel pump driver and interface box is disconnected by determining whether the LPG switch is on or off through analysis of the voltage detected via the voltage detector.

6 Claims, 2 Drawing Sheets

FIG. 2

| signal for determination | voltage(V) | state | warning lamp |
|---|---|---|---|
| 5Hz | • | normal operation | off |
| 10Hz | • | abnormal operation | on |
| no signal | ≈0V | substantial disconnection of the signal line | on |
| | ≈12V | LPG S/W off | off |

DIAGNOSIS SYSTEM FOR LIQUEFIED PETROLEUM INJECTION FUEL PUMP

CROSS-REFERENCE TO RELATED APPLICATIONS

The present application is based on, and claims priority from, Korean Application Serial Number 10-2004-0029976, filed on Apr. 29, 2004, the disclosure of which is hereby incorporated by reference herein in its entirety.

FIELD OF THE INVENTION

The present invention relates to a system of diagnosing a Liquefied Petroleum Injection (LPI) fuel pump. More particularly, the present invention relates to a system that determines whether a signal line is disconnected or a Liquefied Petroleum Gas (LPG) switch is turned off by a user if no signal is inputted from a fuel pump driver into an interface box, thereby preventing erroneous illumination of a warning lamp.

BACKGROUND OF THE INVENTION

Generally, a Liquefied Petroleum Gas (LPG) fuel is injected directly into the engine in a Liquefied Petroleum Injection (LPI) fuel system for improving the engine output and reducing exhaust gas of an LPG vehicle. In the LPI fuel system, an Electronic Control Unit (ECU) of an interface box diagnoses a fuel pump base on a Pulse Width Modulation (PWM) signal inputted from a fuel pump driver. If no PWM signal is inputted into the ECU, then a signal line is determined to be disconnected and a warning lamp is illuminated.

However, one drawback in a conventional LPI fuel system is that if the user turns off an LPG switch while driving, thus preventing the PWM signal from being inputted into the interface box, the ECU of the interface box still determines that the signal line is disconnected and erroneously illuminates the warning lamp.

Another drawback in a conventional LPI fuel system is that a diode is connected to a cut-off solenoid valve or the like to protect the system from a voltage surge generated according to the on/off operation of the LPG switch. This complicates the configuration of the diagnosis system and increases manufacturing costs.

SUMMARY OF THE INVENTION

The present invention determines whether the lack of a signal from a fuel pump to an Electronic Control Unit (ECU) of an interface box is due to a signal line being disconnected or a Liquefied Petroleum Gas (LPG) switch being turned off by a user, thereby preventing erroneous illumination of a warning lamp. The present invention also improves upon the conventional circuit of a LPG switch by removing a diode that protects the circuit from a voltage surge generated according to the on/off operation of the LPG switch, thus simplifying the configuration of the system and decreasing manufacturing costs.

The present invention discloses a Liquefied Petroleum Injection (LPI) fuel pump diagnosis system for determining the operation state of a fuel pump by analyzing a signal inputted from a fuel pump driver of an LPG tank into an interface box. The present invention includes a fuel pump relay that provides power to the fuel pump and cut-off solenoid valves, an LPG switch that allows a user to isolate the fuel supply, a voltage detector disposed in the interface box that detects a voltage between the LPG switch and the fuel pump relay by being connected to a signal line that connects the LPG switch and fuel pump relay, and an ECU of the interface box that determines whether a signal line connecting the fuel pump driver and interface box is disconnected by determining whether the LPG switch is on or off through analysis of the voltage detected via the voltage detector.

When determining the operation state of the fuel pump in the LPI fuel system, if no signal is inputted from a fuel pump driver into an interface box, then the result from the voltage detector of the interface box is analyzed to determine whether the LPG switch is on or off, which in turn determines whether the signal line is substantially disconnected.

In one embodiment of the invention, a pull up resistor is placed in the interface box and connected to the voltage detector. In another embodiment, the LPG switch is positioned so that a diode, conventionally equipped to prevent a voltage surge generated in fuel pump relay, fuel pump driver, and cut-off solenoid valves of an LPG tank and regulator unit, is no longer necessary. In yet another embodiment of the invention, the voltage surge according to the on/off operation of the LPG switch is eliminated via the internal resistor of the fuel pump relay.

BRIEF DESCRIPTION OF THE DRAWINGS

For a better understanding of the nature and objects of the present invention, reference should be made to the following detailed description with the accompanying drawings, in which:

FIG. 2 represents signals for determining the state of a fuel pump according to an embodiment of the present invention.

DETAILED DESCRIPTION OF THE PREFERRED EMBODIMENTS

Figure 1:
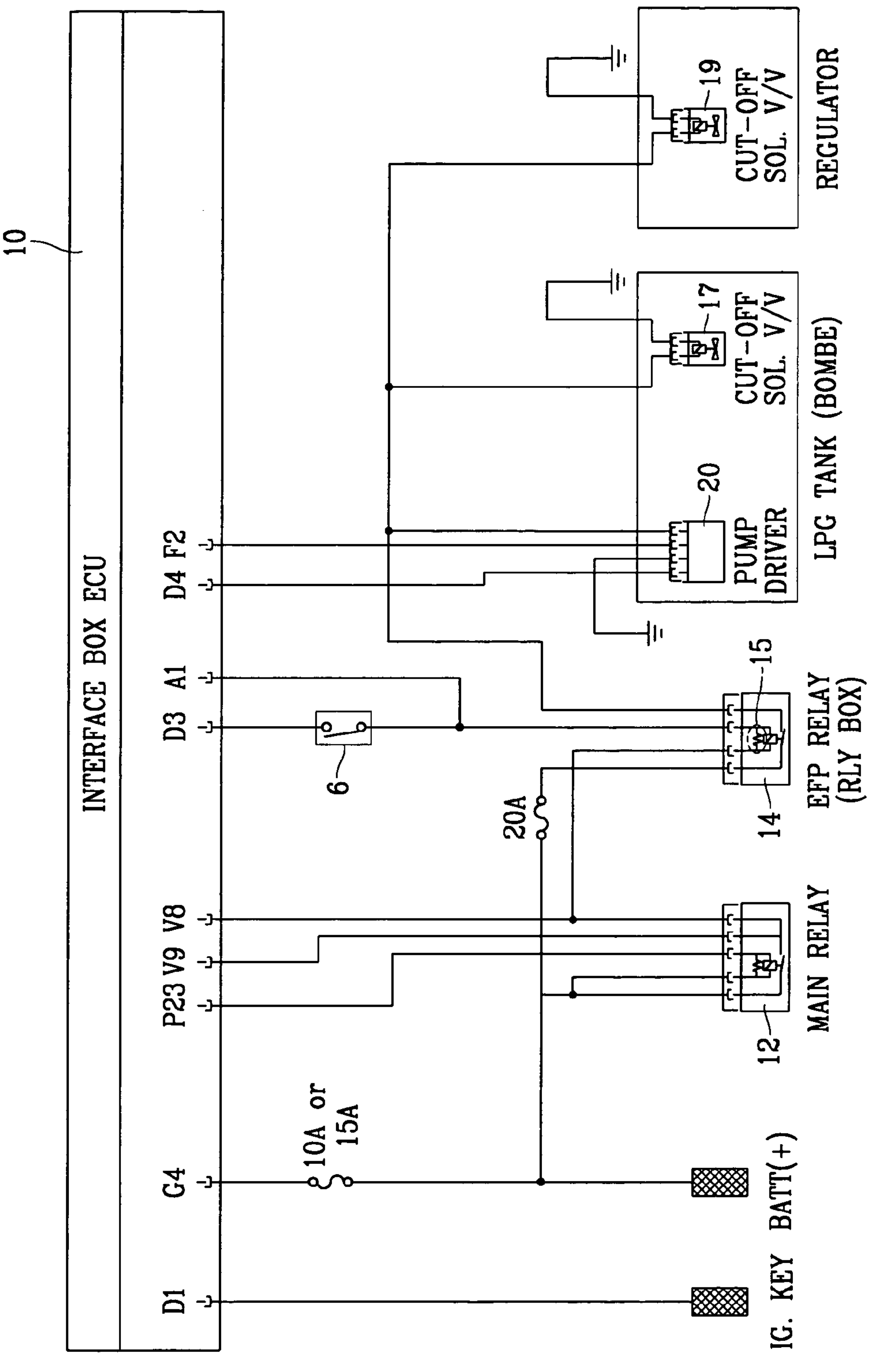
FIG. 1 is a circuit block diagram for diagnosing a Liquefied Petroleum Injection (LPI) fuel pump according to an embodiment of the present invention.

Referring to FIG. 1, a system for diagnosing a Liquefied Petroleum Injection (LPI) fuel pump according to an embodiment of the present invention includes main relay 12 that connects battery (BATT) to various loads of the vehicle while key switch (IG. KEY) is on. Fuel pump relay 14 supplies power to a fuel pump and cut-off solenoid valves 17 and 19. Liquefied Petroleum Gas (LPG) switch 6 isolates the fuel supply by a user's manipulation. Voltage detector (not shown) is located in interface box 10 and detects a voltage by being connected via terminal A1 to a signal line that connects LPG switch 6 and fuel pump relay 14. An Electronic Control Unit (ECU) of interface box 10 diagnoses whether a signal line connecting fuel pump driver 20 and interface box 10 is disconnected by determining an on or off operation state of LPG switch 6 by analyzing the voltage detected via voltage detector.

In one embodiment, a pull up resistor (not shown) is placed in interface box 10 and connected to voltage detector via terminal A1.

In another embodiment, LPG switch 6 is located along a signal line between grounding terminal D3 of interface box 10 and grounding terminal of fuel pump relay 14, which receives power from main relay 12. By positioning LPG switch 6 here, a diode conventionally equipped to prevent a voltage surge generated in fuel pump relay 14, fuel pump driver 20, and cut-off solenoid valves 17 and 19 of an LPG tank and regulator unit according to the on/off operation of LPG switch 6 can be removed. In yet another embodiment of the invention, the voltage surge according to the on/off operation of LPG switch 6 is eliminated via internal resistor 15 of fuel pump relay 14.

The operation of the embodiment of the present invention will now be described with the reference to the accompanying drawings.

ECU of interface box 10 diagnoses the present operation state of the fuel pump by receiving an operation signal (PWM signal) from fuel pump driver 20. FIG. 2 is an example of a table of values that can be used to determine how an input signal should be interpreted in the present invention. According to the table in FIG. 2, if the input signal to interface box 10 is 5 Hz, the fuel pump is operating normally. If the input signal is 10 Hz, then the fuel pump is operating abnormally (e.g., when the fuel pump repeats an on/off operation) and a warning lamp illuminates. The input signal values (5 Hz and 10 Hz) shown in FIG. 2 are examples, and a number of other values may be used instead.

If no signal is inputted, then the determination is made as to whether a signal line is substantially disconnected between interface box 10 and fuel pump driver 20, or LPG switch 6 is turned off, thereby preventing erroneous illumination of the warning lamp.

Referring now to FIG. 1, LPG switch 6 is positioned along the signal line between the grounding terminal of fuel pump relay 14 and grounding terminal D3 of interface box 10. Voltage detector is mounted in interface box 10 for detecting a voltage by being connected via terminal A1 to a signal line that connects LPG switch 6 and fuel pump relay 14. When no signal is inputted from fuel pump driver 20 to interface box 10, the voltage detected by the voltage detector is analyzed to determine whether LPG switch 6 is turned off. The table in FIG. 2 provides an example of voltage values to be used in determining whether LPG switch 6 is on or off. If LPG switch 6 is on, most of the current (12V) applied from main relay 12 flows to the grounding terminal (D3) of interface box 10 through fuel pump relay 14. Therefore, the voltage detected in voltage detector will be close to 0V when LPG switch 6 is on. If that LPG switch 6 is off, the current (12V) from main relay 12 is mostly supplied to voltage detector of interface box 10 through fuel pump relay 14 and terminal A1. Therefore, the voltage detected in voltage detector will be close to 12V when LPG switch 6 is off.

Terminal D4 connects interface box 10 to pump driver 20. If no signal is inputted to terminal D4 of interface box 10 while the voltage detected by voltage detector from terminal A1 is close to 0V (i.e., LPG switch 6 is on), the signal line is determined to be disengaged and the ECU of interface box 10 illuminates the warning lamp. If no signal is inputted into D4 terminal of interface box 10 while LPG switch 6 is turned off, a line-disconnection is not determined and thus the warning lamp is not illuminated.

The technical concept is not limited to the embodiment of the present invention, however, should be determined by a logical interpretation within the scope of claims of the present invention.

As apparent from the foregoing, there is an advantage in that an incorrect diagnosis of the fuel pump due to the turned off LPG switch is prevented. Another advantage is that the LPG switch is located between the fuel pump relay and interface box without a diode that prevents a voltage surge generated according to the on and off operation of the LPG switch, thus reducing manufacturing costs.

What is claimed is:

1. A diagnosis system for a Liquefied Petroleum Injection fuel pump that determines the operation state of the fuel pump by analyzing a signal inputted from a fuel pump driver of a Liquefied Petroleum Gas tank into an interface box, the system comprising:

a fuel pump relay for providing power to the fuel pump and cut-off solenoid valves;

a Liquefied Petroleum Gas switch for isolating a fuel supply and configured to be operated by a user;

a first signal line connecting the fuel pump relay and the Liquefied petroleum Gas switch;

a voltage detector disposed in the interface box for detecting a voltage, wherein the voltage detector is connected to the first signal line and the voltage detected by the voltage detector indicates whether the Liquefied Petroleum Gas switch is on or off;

a second signal line connecting the fuel pump driver and the interface box; and an Electronic Control Unit of the interface box configured to determine whether the second signal line is disconnected, wherein the Electronic Control Unit is also configured to analyze the voltage detected by the voltage detector.

2. The system as defined in claim 1, wherein a pull up resistor connected to the voltage detector is further equipped in the interface box.

3. The system as defined in claim 1, wherein an internal resistor is mounted in the fuel pump relay to remove a voltage surge generated according to the on/off operation of the Liquefied Petroleum Gas switch.

4. The system as defined in claim 1, wherein the Liquefied Petroleum Gas switch is disposed along a signal line that connects the fuel pump relay and the interface box, thus eliminating the need for a diode to protect a circuit in the diagnosis system from a voltage surge generated according to an on/off operation of the Liquefied Petroleum Gas switch.

5. A diagnosis system for a Liquefied Petroleum Injection fuel pump that determines the operation state of the fuel pump, the system comprising:

a fuel pump relay for providing power to the fuel pump;

a first signal line connecting a fuel pump driver and an interface box;

a second signal line connecting the fuel pump relay and a Liquefied Petroleum Gas switch;

a voltage detector receiving voltage from the second signal line; and an Electronic Control Unit for analyzing the voltage detected by the voltage detector and the signal received by the interface box from the fuel pump driver.

6. The system as defined in claim 5, wherein the second signal line also connects the fuel pump relay to the interface box.

* * * * *